United States Patent [19]

Smith et al.

[11] 4,349,737
[45] Sep. 14, 1982

[54] DETERMINATION OF MOVABLE OIL SATURATIONS

[75] Inventors: Roger L. Smith, Tulsa; Robert P. Murphy, Bixby, both of Okla.

[73] Assignee: Standard Oil Company (Indiana), Chicago, Ill.

[21] Appl. No.: 167,878

[22] Filed: Jul. 14, 1980

[51] Int. Cl.$^3$ .............................................. G01V 5/00
[52] U.S. Cl. .................................................. 250/259
[58] Field of Search ........................ 250/256, 258, 259

[56] References Cited

U.S. PATENT DOCUMENTS 3,282,095  11/1966  Owens .
3,748,474   7/1973  Murphy ............................... 250/259
3,825,752   7/1974  Murphy et al. ..................... 250/258

OTHER PUBLICATIONS

Murphy, R. P., et al. "The Use of Special Coring and Logging Procedures for Defining Reservoir Residual Oil Saturations," JPT (Jul. 1973).

Murphy, R. P., et al. "Evaluation of Waterflood Residual Oil Saturations Using Log-Inject-Log Procedures," SPE Paper 5804, presented at SPE-AIME Symposium, Mar. 1976.

*Primary Examiner*—Alfred E. Smith
*Assistant Examiner*—Janice A. Howell
*Attorney, Agent, or Firm*—Scott H. Brown; Fred E. Hook

[57] ABSTRACT

This invention relates to determining the movable oil saturation in underground rock reservoir by use of a log-inject-log technique. The formation rock adjacent to the wellbore is prepared such that the saturation conditions are representative of those in the interwell area. A pulsed neutron log is then run. A crude oil is injected into the formation. A second pulsed neutron log is then run. A chlorinated crude oil is injected into the formation to displace the previously injected crude oil. A third pulsed neutron log is then run. A salt water of known salinity is then injected into the well to displace a portion of the chlorinated crude oil and all of the formation water. A fourth pulsed neutron log is then run. Fresh water is then injected into the formation to displace the injected salt water. A fifth pulsed neutron time log is then run. These five logs are then used to determine the reservoir characteristics.

6 Claims, No Drawings

DETERMINATION OF MOVABLE OIL SATURATIONS

BACKGROUND OF THE INVENTION

1. Field of the Invention

This invention relates to a method of logging a subsurface formation penetrated by a wellbore to determine movable oil saturation. It particularly concerns a method to determine movable oil saturations in formations where the salinity and capture cross section of the formation water is unknown.

2. Setting of the Invention

In planning or engineering the production of oil from an underground formation which has been subjected to a waterflood, it is important to know the amount of oil in place. The oil in such underground reservoirs is contained in pores of the rock. However, these pores contain more than oil. It is known that all such pores contain some water and quite frequently also contain gas. It is most important to know the amount of movable oil contained in the rock reservoir to evaluate production, secondary recovery and reservoir completion methods.

Cores can be recovered to the surface and the rock porosity determined; however, the knowledge of the porosity in the rock does not give a complete knowledge of the amount of the oil in the rock. One must still determine what part of the core pore space is filled with water, with oil and with gas. One can measure the quantities of gas, oil and water in the core that have been brought to the surface and determined the water, oil and gas saturations in the core. However, experience has shown that the fluid content of the core at the surface is seldom the same as the fluid content of the core in its natural condition in a reservoir. The only logging device available which is described as capable of measuring formation oil saturation or movable oil saturation directly is a carbon oxygen log which does not attain sufficient measurement accuracy. Formation oil saturation means that percent of the fluid in the pore space of the reservoir rock that is oil and movable oil saturation means the difference between the total oil presently in place and the residual oil saturation left after a waterflood technique has been performed on a formation.

There are logging devices, however, which can provide a measure of water saturation. Water saturations can be computed from these logging devices with an accuracy of ±15%. If gas saturation exists, it can be measured by independent methods such as described in U.S. Pat. No. 3,282,095.

Oil saturation may be calculated as the difference between pore space calculated at the surface from the core and the water and gas saturations. Such calculations are illustrated by U.S. Pat. No. 3,825,752, Murphy, et al., entitled "Log-Inject-Log" System and issued July 23, 1974.

Movable oil saturations may be calculated for formations in which the capture cross section of the formation water is known. Methods for such calculations are illustrated in Murphy, R. P. and Owens, W. W., "The Use of Special Coring and Logging Procedures for Defining Reservoir Residual Oil Saturations," Journal of Petroleum Technology (July 1973) and Murphy, R. P., Foster, G. T., and Owens, W. W., "Evaluation of Waterflood Residual Oil Saturations Using Log-Inject-Log Procedures," SPE Paper 5804, presented at SPE-AIME Symposium, March 1976.

Most reservoirs which have been subjected to waterflood and some primary reservoirs contain waters of multiple levels of salinity. There are no methods using log-inject-log or conventional techniques presently available for determining movable oil saturations in a reservoir containing multiple or varying salinity waters.

BRIEF DESCRIPTION OF THE INVENTION

This invention relates to determining the movable oil saturation in an underground rock reservoir by use of a log-inject-log technique. The formation adjacent to the wellbore is produced such that the saturation conditions in the vicinity of the wellbore approaches those in the surrounding formation. A pulse neutron log is then run on the formation. A crude oil is then injected into the formation to displace some movable water and movable oil. A second pulsed neutron log is then run on the formation. A chlorinated hydrocarbon is injected into the formation to displace the crude oil previously injected into the formation. A third pulsed neutron log is then run on the formation. An aqueous solution of known salinity is then injected into the formation to displace the previously injected chlorinated hydrocarbon. A fourth pulsed neutron log is then run on the formation. A potable water solution containing a known chloride ion concentration and a known capture cross section is then injected in the formation to displace the previously injected salt water solution. A fifth pulsed neutron log is then run on the formation. By using the response of the five logs, the formation's movable oil saturation can be determined.

DETAILED DESCRIPTION OF THE INVENTION

The invention can be used with any logging process desirable to determine the movable oil saturation in a formation which has been subjected to waterflood techniques or contains formation waters of unknown capture cross section. A preferred equation used to calculate the movable oil saturation from the response of the pulsed neutron logs is:

$$S_{om} = \left[ \frac{\Sigma_{ff} - \Sigma_{fp}}{\phi(\Sigma_{wp} - \Sigma_o)} \right] + \left[ \frac{\Sigma_{wp} - \Sigma_{wf}}{\Sigma_{wp} - \Sigma_o} \right] \left[ \frac{\Sigma_{fw} - \Sigma_{ff}}{\phi(\Sigma_{ws} - \Sigma_{wf})} \right] \quad (1)$$

The following are used in Equations 1–5.

$S_{om}$ = movable oil saturation, fraction of pore space.

$S_{wr}$ = created reduced water saturation, fraction of pore space calculated from Equation 2.

$\Sigma_{ff}$ = average neutron capture cross section of the formation after injecting fresh water or low salinity water, capture units; log response must be corrected for neutron diffusion effects.

$\Sigma_{fw}$ = average neutron capture cross section of the formation after injecting salt water, capture units; log response must be corrected for neutron diffusion effects.

$\Sigma_{fo}$ = average neutron capture cross section of formation after injecting crude oil, capture units; log response must be corrected for neutron diffusion effects.

$\Sigma_{foc}$ = average neutron capture cross section of the formation after injecting chlorinated crude oil, capture units; log response must be corrected for neutron diffusion effects.

$\Sigma_{fp}$=average neutron capture cross section of the formation after production, capture units; log response must be corrected for neutron diffusion effects.

$\Sigma_{ma}$=thermal neutron capture cross section of the rock matrix calculated from Equation 4.

$\Sigma_o$=thermal neutron capture cross section of formation crude oil, capture units; capture cross section is calculated from composition of oil.

$\Sigma_{oc}$=thermal neutron capture cross section of chlorinated crude oil, capture units; capture cross section is calculated from composition of chlorinated crude oil.

$\Sigma_{wf}$=thermal neutron capture cross section of the injected fresh water as computed from mineral analysis of water, capture units; capture cross section is calculated from mineral composition of water.

$\Sigma_{wp}$=thermal neutron capture cross section of formation water capture units calculated from Equation 5.

$\Sigma_{ws}$=thermal neutron capture cross section of the injected salt water as computed from mineral analysis of water, capture units; capture cross section is calculated from mineral composition of water.

$\phi$=formation porosity, fraction of bulk volume; porosity is derived from log and/or core porosities.

The technique in determining $\Sigma_{fp}$, $\Sigma_{fo}$, $\Sigma_{foc}$, $\Sigma_{fw}$, and $\Sigma_{ff}$ is presented in the following step form.

STEP 1

The formation adjacent a well is conditioned to establish as near as possible the same gas, oil and water saturation adjacent to the wellbore as exists at present in the rock formation remote from the wellbore. All well logging techniques currently known measure physical properties of the rock formation and their fluid content immediately adjacent the bore. There is some variation in the effective depth of investigation, but at best this is only a few feet. On the other hand, it is well known to reservoir engineers that the relative content of gas, oil and formation water which is a considerable distance from the wellbore is frequently quite different from that near the wellbore. For example, high production rates which usually result in a high pressure gradient between the wellbore and the inner well area frequently cause water or gas coning or gas liberation which alters the fluid saturation distribution of the formation near the wellbore. As a different example, if a new well is drilled into a partly depleted formation or if coring is carried out in a oil well, the presence of the drilling fluid may introduce changes in saturation near the bore as compared to deeper in the formation. If water or oil base mud is used in coring or drilling, the filtrate will, depending upon the nature of the filtrate, cause too high a water or oil saturation in the core or the formation near the wellbore. Thus, it is clear that it is desirable before commencing the logging operation to restore the formation as nearly as possible to steady state conditions or the condition in the reservoir at locations remote from the wellbore.

In general, the formation may be conditioned adjacent to the wellbore by controlled production. The well is produced at a very low rate so as to have a small pressure drop between the wellbore and the formation remote from the well. This permits liquids present in the reservoir formation immediately adjacent the bore to approximate the saturations prevailing in the reservoir rock at a considerable distance from the wellbore. Thus, the relative fluid content of the reservoir rock adjacent the wellbore approaches steady state conditions which exist in most of the reservoir.

Step 1 teaches the conditioning of the well to produce as nearly as possible the same gas, oil and water saturation adjacent the bore as that present in the rock formation remote from the wellbore. This step is essential whether gas saturation exists or not. However, it is to be noted that the overall procedure of this invention is slightly different for those situations where gas saturation exists and where it does not. In the continuing explanation of the invention and particularly involving Steps 2 through 10, it will be first assumed that no gas saturation exists in the rock pore space.

STEP 2

A pulsed neutron logging device is run through the wellbore conditioned in accordance with Step 1 and $\Sigma_{fp}$ is obtained.

STEP 3

All formation oil and any movable water in the formation is driven out of the formation immediately adjacent the wellbore with a crude oil. The crude oil is injected to reduce formation water saturation to a reduced water saturation, $S_{wr}$.

STEP 4

Rerun the logging device of Step 2 and obtain $\Sigma_{fo}$.

STEP 5

All the previously injected crude oil is driven out of the formation immediately adjacent the wellbore with an injected chlorinated hydrocarbon.

STEP 6

Rerun the logging device of Step 2 and obtain $\Sigma_{foc}$.

STEP 7

A portion of the chlorinated hydrocarbon and all the formation water is driven out of the formation immediately adjacent the wellbore with an injected aqueous solution of known salinity.

STEP 8

Rerun the logging device from Step 2 and obtain $\Sigma_{fw}$.

STEP 9

All the aqueous saline solution is driven out of the formation by a fresh water of a known chloride concentration and a known thermal neutron capture cross section.

STEP 10

Rerun the logging device from Step 2 and obtain $\Sigma_{ff}$.

Steps 3 and 5 may be performed in reverse sequence as may Steps 7 and 9.

The displacement of a preceding fluid by the driving fluid is considered complete when the response of the pulsed neutron log, run periodically during the injection processes, shows no additional changes in the formation measurements.

The crude oil which is injected into the formation should be a hydrocarbon which is miscible with the formation crude oil, immiscible with water, and has a capture cross section which is similar to that of the formation crude oil. The chlorinated hydrocarbon should be a hydrocarbon which is miscible with the formation crude oil, immiscible with water and has a capture cross section which is known and sufficiently high to allow the logging device to differentiate between the crude oil and the chlorinated hydrocarbon. Preferably, the chlorinated hydrocarbon has a capture cross section above 70 C.U. A suitable chlorinated hydrocarbon comprises 0.084 barrel of a mixture of trichloroethylene per barrel of crude oil, the crude oil having a capture cross section of 23.9 C.U. and the chlorinated hydrocarbon having a capture cross section of 78 C.U.

Each of the logs can be run a number of times and the responses averaged to minimize the effects of any statistical variation in the response. The average capture cross section is determined for each interval of interest.

Values for $\Sigma_{fo}$, $\Sigma_{foc}$, $\Sigma_o$, $\Sigma_{oc}$, and $\phi$ are substituted into $$S_{wr} = 1 - \left( \frac{\Sigma_{foc} - \Sigma_{fo}}{\phi(\Sigma_{oc} - \Sigma_o)} \right) \quad (2)$$

Values for $\Sigma_{fw}$, $\Sigma_{ff}$, $\Sigma_{ws}$, $\Sigma_{wf}$ and $\phi$ are substituted into $$S_{or} = 1 - \frac{\Sigma_{fw} - \Sigma_{ff}}{\phi(\Sigma_{ws} - \Sigma_{wf})} \quad (3)$$

Values for $\Sigma_{ff}$, $\Sigma_{wf}$, $\Sigma_o$, $S_{or}$ and $\phi$ are substituted into $$\Sigma_{ma} = \frac{\Sigma_{ff} - \Sigma_{wf}\phi + \phi S_{or}(\Sigma_{wf} - \Sigma_o)}{1 - \phi} \quad (4)$$

Values of $\Sigma_{fo}$ and $\phi$ are substituted with the values $\Sigma_{ma}$ and $S_{wr}$ in $$\Sigma_{wp} = \frac{\Sigma_{fo} - (1 - \phi)\Sigma_{ma} - (1 - \Sigma_{wi})\phi \Sigma_o}{S_{wi}\phi} \quad (5)$$

Values for $\Sigma_{ff}$, $\Sigma_{fp}$, $\phi$, $\Sigma_{wp}$, $\Sigma_o$, $\Sigma_{wf}$, $\Sigma_{fw}$ and $\Sigma_{ws}$ are substituted into Equation 1 and $S_{om}$ movable oil saturation for the interval is determined.

If the reservoir does contain gas, the gas saturation may be determined as described in U.S. Pat. No. 3,282,095.

The technique of this invention may be used in either cased or open hole wells. The rates of injection of the driving fluid should be maintained such that the residual oil is not displaced.

Although the above description has been given in considerable detail, it is possible to make modifications in the procedure without departing from the spirit or the scope of the invention.

What is claimed is:

1. A method of logging a subsurface formation containing formation oil and water penetrated by a wellbore which comprises:
   a. producing said oil and water from said formation into said wellbore at a sufficiently low rate that the pressure in the formation adjacent to the wellbore approaches the pressure in the formation remote from the wellbore,
   b. running a pulsed neutron log,
   c. injecting crude oil into said formation until the response of a pulsed neutron log is essentially unchanged with continued injection of said crude oil,
   d. injecting chlorinated hydrocarbon into said formation until response of a pulsed neutron log is essentially unchanged with continued injection of said chlorinated hydrocarbon,
   e. injecting an aqueous solution of known salinity and known neutron capture cross section into said formation until response of a pulsed neutron log is essentially unchanged with continued injection of said aqueous solution, and
   f. injecting fresh water into said formation until response of a pulsed neutron log is essentially unchanged with continued injection of said fresh water, said fresh water having a known capture cross section which is sufficiently lower than the neutron capture cross section of said aqueous solution.

2. A method of determining reservoir characteristics of a subsurface formation containing formation oil and water penetrated by a wellbore which comprises:
   a. producing said oil and water from said formation into said wellbore at a sufficiently low rate that the pressure in the formation adjacent to the wellbore approaches the pressure in the formation remote from the wellbore,
   b. running a pulsed neutron log,
   c. injecting crude oil into said formation until the response of a pulsed neutron log is essentially unchanged with continued injection of said crude oil,
   d. injecting chlorinated hydrocarbon into said formation until response of a pulsed neutron log is essentially unchanged with continued injection of said chlorinated hydrocarbon,
   e. injecting an aqueous solution of known salinity and known neutron capture cross section into said formation until response of a pulsed neutron log is essentially unchanged with continued injection of said aqueous solution,
   f. injecting fresh water into said formation until response of a pulsed neutron log is essentially unchanged with continued injection of said fresh water, said fresh water having a known capture cross section which is sufficiently lower than the neutron capture cross section of said aqueous solution, and
   g. obtaining log responses in steps b-f when said log responses are essentially unchanged with continued injection of said crude oil, chlorinated hydrocarbon, aqueous solution and said fresh water and using said log responses to determine movable oil saturation of said formation.

3. A method of logging a subsurface formation containing formation oil and water penetrated by a wellbore which comprises:
   a. producing said oil and water from said formation into said wellbore at a sufficiently low rate that the pressure in the formation adjacent to the wellbore approaches the pressure in the formation remote from the wellbore,
   b. running a pulsed neutron log,
   c. injecting chlorinated hydrocarbon into said formation until response of a pulsed neutron log is essentially unchanged with continued injection of said chlorinated hydrocarbon,
   d. injecting crude oil into said formation until the response of a pulsed neutron log is essentially unchanged with continued injection of said crude oil,
   e. injecting an aqueous solution of known salinity and known neutron capture cross section into said formation until response of a pulsed neutron log is essentially unchanged with continued injection of said aqueous solution, and f. injecting fresh water in said formation until response of a pulsed neutron log is essentially unchanged with continued injection of said fresh water, said fresh water having a known capture cross section which is sufficiently lower than the neutron capture cross section of said aqueous solution.

4. A method of logging a subsurface formation containing formation oil and water penetrated by a wellbore which comprises:

a. producing said oil and water from said formation into said wellbore at a sufficiently low rate that the pressure in the formation adjacent to the wellbore approaches the pressure in the formation remote from the wellbore, b. running a pulsed neutron log, c. injecting crude oil into said formation until the response of a pulsed neutron log is essentially unchanged with continued injection of said crude oil, d. injecting chlorinated hydrocarbon into said formation until response of a pulsed neutron log is essentially unchanged with continued injection of said chlorinated hydrocarbon, e. injecting fresh water into said formation until response of a pulsed neutron log is essentially unchanged with continued injection of said fresh water, said fresh water having a known capture cross section which is sufficiently lower than the neutron capture cross section of an aqueous solution of known salinity and known neutron capture cross section and f. injecting an aqueous solution of known salinity and known neutron capture cross section into said zone until response of a pulsed neutron log is essentially unchanged with continued injection of said aqueous solution.

5. A method of logging a subsurface formation containing formation oil and water penetrated by a wellbore which comprises:

a. producing said oil and water from said formation into said wellbore at a sufficiently low rate that the pressure in the formation adjacent to the wellbore approaches the pressure in the formation remote from the wellbore, b. running a pulsed neutron log, c. injecting chlorinated hydrocarbon into said formation until response of a pulsed neutron log is essentially unchanged with continued injection of said chlorinated hydrocarbon, d. injecting crude oil into said formation until the response of a pulsed neutron log is essentially unchanged with continued injection of said crude oil, e. injecting fresh water into said formation until response of a pulsed neutron log is essentially unchanged with continued injection of said fresh water, said fresh water having a known capture cross section which is sufficiently lower than the neutron capture cross section of an aqueous solution, of known salinity and known neutron capture cross section and f. injecting an aqueous solution of known salinity and known neutron capture cross section into said formation until response of a pulsed neutron log is essentially unchanged with continued injection of said aqueous solution.

6. A method of determining movable oil saturation of a subsurface formation containing formation oil and water penetrated by a wellbore which comprises:

a. producing said oil and water from said formation into said wellbore at a sufficiently low rate that the pressure in the formation adjacent to the wellbore approaches the pressure in the formation remote from the wellbore, b. running a pulsed neutron log, c. injecting crude oil into said formation until the response of a pulsed neutron log is essentially unchanged with continued injection of said crude oil, d. injecting chlorinated hydrocarbon into said formation until response of a pulsed neutron log is essentially unchanged with continued injection of said chlorinated hydrocarbon, e. injecting an aqueous solution of known salinity and known neutron capture cross section into said formation until response of a pulsed neutron log is essentially unchanged with continued injection of said aqueous solution, f. injecting fresh water into said formation until response of a pulsed neutron log is essentially unchanged with continued injection of said fresh water, said fresh water having a known capture cross section which is sufficiently lower than the neutron capture cross section of said aqueous solution, and g. obtaining log responses in steps b-f when said log responses are essentially unchanged with continued injection of said crude oil, chlorinated hydrocarbon, aqueous solution and said fresh water and using said log responses to determine movable oil saturation of said formation.

* * * * *